United States Patent [19]
Raymond et al.

[11] Patent Number: 5,579,367
[45] Date of Patent: Nov. 26, 1996

[54] MULTI-MEDIUM CLOSED-LOOP CONTROLLED SATELLITE BROADCAST NETWORK FOR SIMPLE END-USER OPERATION

[75] Inventors: J. Brian Raymond, Hayward; Dan E. Bower, Newark, both of Calif.

[73] Assignee: Chaparral Communications, Inc., San Jose, Calif.

[21] Appl. No.: 403,274

[22] Filed: Mar. 13, 1995

[51] Int. Cl.⁶ .............................. H04M 1/24; G01S 5/02; G01S 3/02; H04B 7/185
[52] U.S. Cl. .................................... 379/1; 379/2; 379/29; 342/357; 342/450; 342/457; 455/3.2; 455/3.3; 455/12.1; 455/67.1; 455/226.1
[58] Field of Search .............................. 379/1, 2, 59, 56, 379/57, 29; 455/3.2, 3.3, 12.1, 67.1, 226.1; 342/352, 357, 359, 450, 457; 340/825.16, 825.44

[56] References Cited

U.S. PATENT DOCUMENTS

| | | | |
|---|---|---|---|
| 4,860,352 | 8/1989 | Laurance | 455/12.1 |
| 4,990,924 | 2/1991 | McMullen | 342/359 |
| 5,073,900 | 12/1991 | Mallinckrodt | 379/59 |
| 5,347,286 | 9/1994 | Babitch | 342/352 |
| 5,402,347 | 3/1995 | McBurney | 342/357 |
| 5,448,623 | 9/1995 | Wiedeman | 455/12.1 |
| 5,455,823 | 10/1995 | Noreen | 455/12.1 |

*Primary Examiner*—Wellington Chin
*Assistant Examiner*—Vijay Shankar
*Attorney, Agent, or Firm*—Law Offices of Thomas E. Schatzel A Prof. Corporation

[57] ABSTRACT

A satellite network receiver connected to receive video and audio programs and commands from orbiting satellites through a steerable dish antenna. Commands are alternatively received by the satellite receiver via pager radio service or phone wire from a network controller that uplinked the satellite programming. All user controls are eliminated from the satellite receiver and the network controller uses its command capability to steer the users antenna and to analyze and initiate diagnostics performed on various parts of the satellite receiver.

6 Claims, 3 Drawing Sheets

MULTI-MEDIUM CLOSED-LOOP CONTROLLED SATELLITE BROADCAST NETWORK FOR SIMPLE END-USER OPERATION

BACKGROUND OF THE INVENTION

1. Field of the Invention

The invention relates generally to satellite communication equipment and more specifically to networks that control programming sent to users through broadcasts from many satellites.

2. Description of the Prior Art

Numerous specialized video programs and interactive networks are broadcast everyday to a wide variety of users distributed across the United States by orbiting satellites. These networks are tremendously complex and difficult to maintain. However, great advances have been made in the simplification of user controls for satellite receivers that tune into these networks. But the presence of even a few controls on a satellite receiver seems to invite trouble, confused users and unauthorized users often misalign such controls.

With conventional equipment, users are required to select a proper satellite to be received by their dish antenna, and then to cause the antenna's aiming to change appropriately. Even this basic function in satellite network use requires a user to know which satellite is carrying the program of interest, and then to point the antenna at it using azimuth, elevation and polar axis rotation controls. The prior art has provided open-loop control systems that can park a dish antenna at one of several predetermined positions, but once set, the prior art systems blindly repeat such settings without regard to the satellite signal and the programming sought after.

SUMMARY OF THE PRESENT INVENTION

It is therefore an object of the present invention to provide a satellite network receiver that is easy to use and relatively foolproof.

It is a further object of the present invention to provide a satellite network receiver that automatically tunes itself according to the programming scheduled to be received.

Briefly, an embodiment of the present invention comprises a satellite network receiver connected to receive video and audio programs and commands from orbiting satellites through a steerable dish antenna. Commands can also be received by the satellite receiver via pager radio service or phone wire from a network controller that uplinks the satellite programming. All user controls are eliminated from the satellite receiver and the network controller uses its command capability to steer the users antenna and to analyze and initiate diagnostics performed on various parts of the satellite receiver.

An advantage of the present invention is that a satellite network receiver is provided that requires no user intervention for proper operation and reception of programming from several satellite program sources.

Another advantage of the present invention is that a satellite network is provided that allows a network controller to tune it according to program subscription schedules.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENTS

Figure 1:
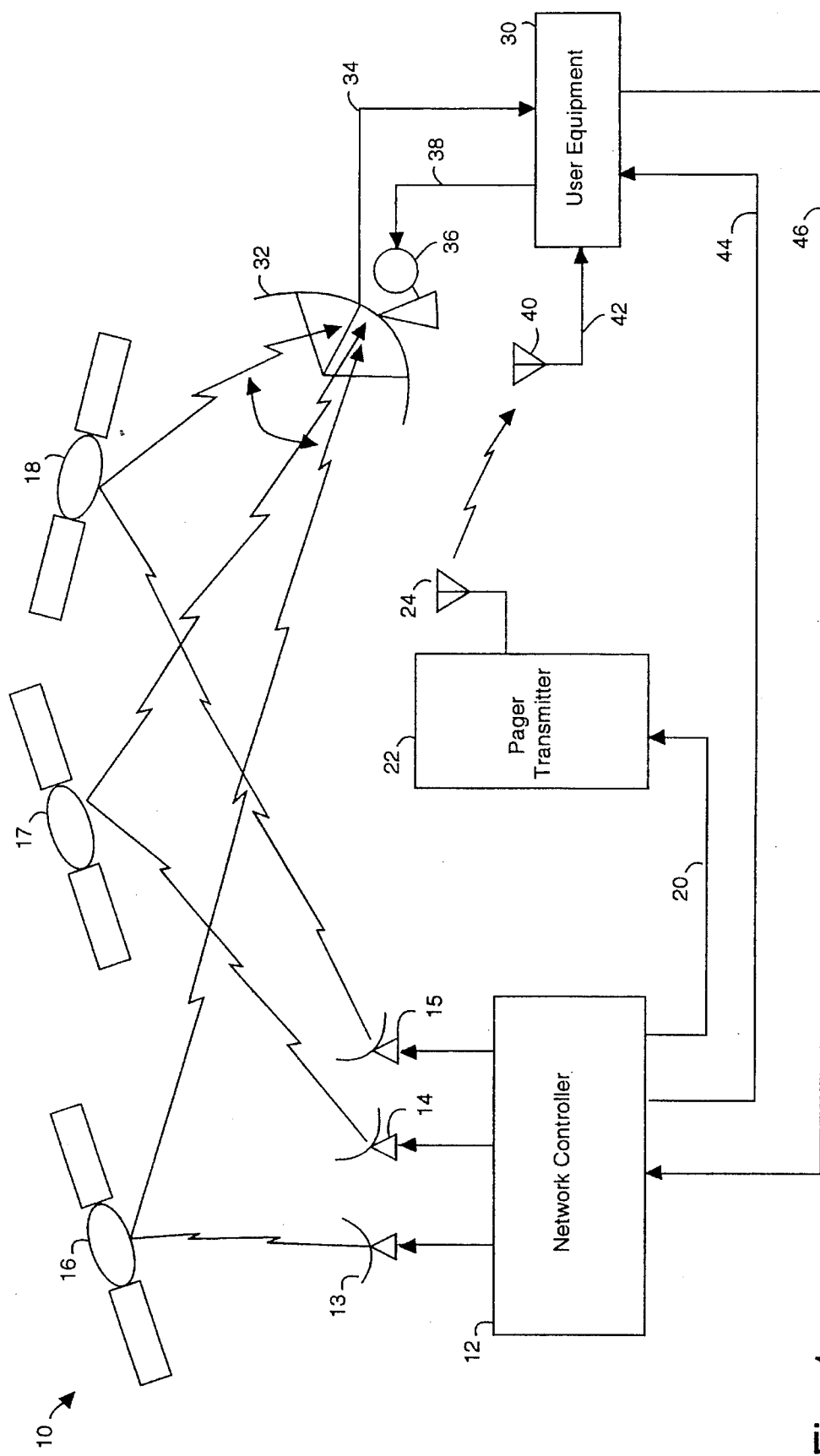
FIG. 1 is a system block diagram of a network of the present invention.

FIG. 1 illustrates a network-controlled satellite broadcast system embodiment of the present invention, referred to by the general reference numeral 10. The system 10 comprises a network controller 12 that transmits video and audio programming and command signals from a set of uplink antennas 13–15 to a plurality of satellites 16–18 in different earth orbits. The system 10 further comprises a pager-command line 20 connected to a pager-service transmitter 22 (e.g., 929–930 MHz and 931–932 MHz in the USA) with a transmitter antenna 24. Alternative to pager-service transmitter 22, other wireless technologies may be included along with suitable receivers, such as wireless modems (e.g., RADIOMAIL, 896–901 MHz, 902–928 MHz, and 935–940 MHz), PCS (1850–1990 MHz), two-way paging narrowband PCS (901–902 MHz, 930–931 MHz, and 940–941 MHz), cellular telephone (824–849 MHz and 869–894 MHz), and satellite.

A plurality of user sites each typically include a user equipment 30 attached to a servo-controlled dish antenna 32 by a downlink cable 34. A dish antenna positioning motor 36 is connected by a controller cable 38 and a pager-service receiver antenna 40 is connected by an antenna line 42. The network controller 12 accesses the user equipment 30 directly by a telephone connection 44. A telephone connection 46 provides communication from the user equipment 30 to the network controller 12. Both the connections 44 and 46 may be the same telephone system subscription drop and connected by the direct distance dialing network provided by the local telephone companies. Alternatively, the connections 44 and 46 may be provided by such computer-based services as e-mail and the internet through interfaces such as ETHERNET local area network controller adaptors.

Further information about the pager-service communication and function is provided in co-pending U.S. patent application Ser. No. 08/358,720, filed Dec. 19, 1994, and incorporated herein by reference.

In operation, the user equipment 30 is scheduled to receive a particular audio and/or video program transmitted by one of the satellites 16–18. A control signal is sent by the user equipment 30 to the motor 36 to position the antenna 32 appropriately. Signals received from the satellites 16–18 are used by the user equipment to verify reception of the correct satellite signal. The dish antenna 32 is so orientation selective only one satellite 16–18 can be received at a time. The timing and the antenna positioning information needed by the user equipment is provided by the network controller 12 via command signals transmitted through the satellites 16–18, the pager-service transmitter 22 and/or the telephone connection 44. Signal quality problems with any of these command sources are automatically reported back to the network controller 12 by the user equipment 30 with the telephone connection 46.

Figure 2:
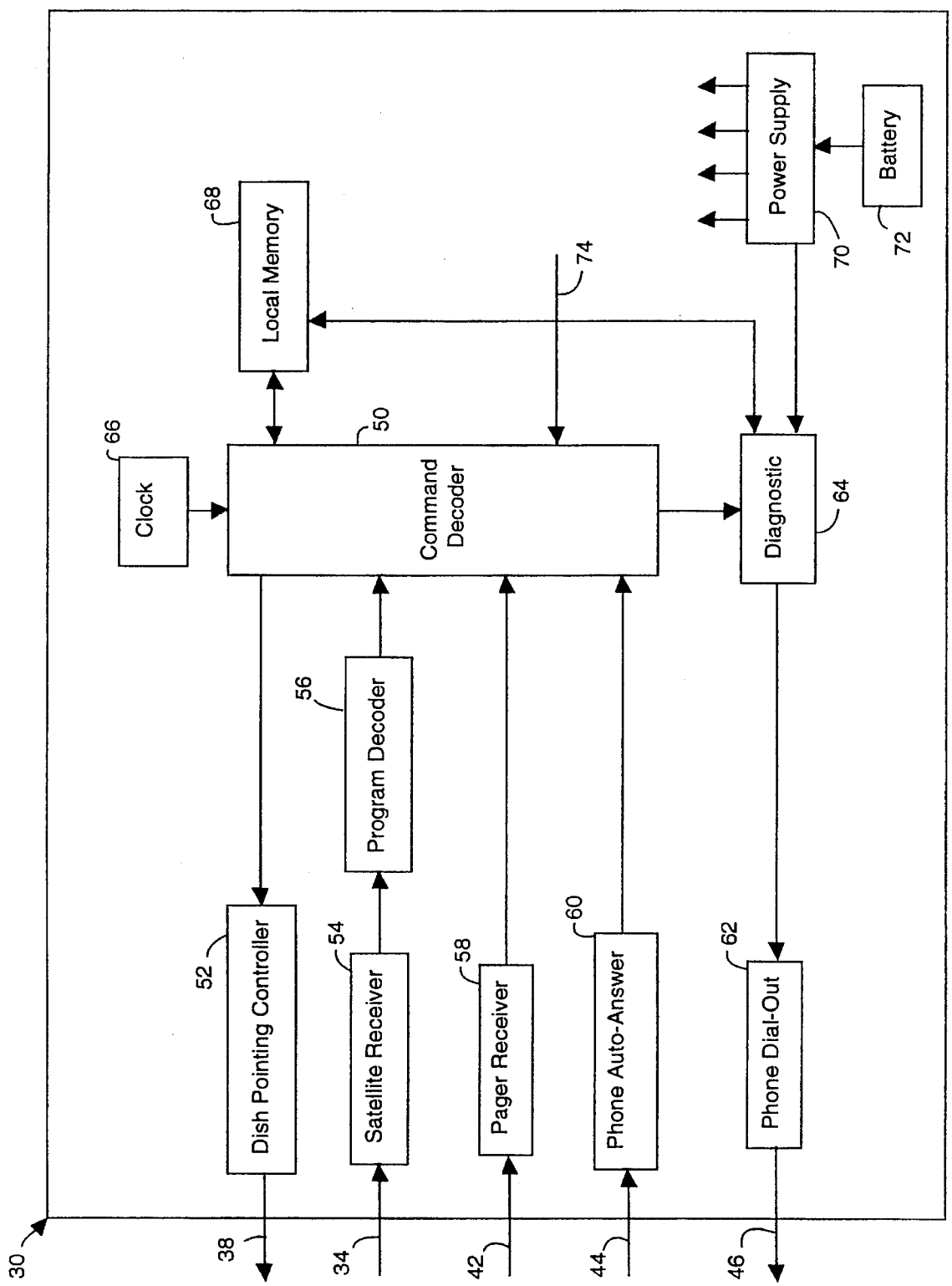
FIG. 2 is a block diagram of the satellite receiver in the network of FIG. 1.

In FIG. 2, the user equipment 30 is shown to comprise a command decoder 50 connected to a dish-pointing controller 52, a satellite receiver 54 with a program decoder 56, a pager receiver 58, a phone answering interface 60, an outbound auto-dial phone interface 62, a diagnostic unit 64, and time-of-day clock 66 and a local memory 68. The pager receiver 58 includes a unique identification code that is used to distinguish messages directed to a single particular pager receiver 58. A power supply 70 provides continuous operating power for all the elements of the user equipment 30 and is able to continue operating during utility power failures by virtue of a battery 72. Information about any such power failure is recorded by the diagnostic unit 64 in the local memory 68 with time tags provided by the clock 66 for later reporting to the network controller 12 through the outbound phone interface 62. The timing and duration of power failures can bear on the ability of the user equipment 30 to bridge the power outage.

Commands issued by the network controller 12 are passed to the user equipment 30 by attaching a unique receiver serial identification code in satellite broadcasts to the commands, or by sending the command by pager according to a subscriber number dial-up in the pager transmitter 22 over pager-command line 20. In the event that no radio signals are being received by pager or satellite by the user equipment 30, the auto-answer interface 60 can receive commands over land-lines or alternative communication services, e.g., the internet.

The diagnostic unit 64 monitors the health of the satellite receiver 54 as deciphered through the program decoder 56, and the health of the pager receiver 58. Signal quality problems are automatically reported to the network controller over line 46 on a change-of-status basis, a time-slot basis or by command inquiry only. The diagnostic unit 64 assists the network controller 12 in troubleshooting problems, reconfiguring the network, detecting and correcting satellite tracking and broadcast problems. In a nation-wide broadcast in a network, some user sites around the country may be suffering from adverse weather conditions that can degrade or otherwise interfere with satellite program reception, e.g., as a result of rain fade. Prior art equipment would blindly continue on, ignorant of the loss of a few users in the network. The diagnostic unit 64 analyses such problems and reports their existence to the network controller 12 so that corrective action can be taken, e.g., by boosting satellite transmission power, or by sending targeted commands for individually trimming the pointing of a particular dish antenna 32 with its servo motor 36 via the site's controller 52. For example, the presence of a wind load on the dish antenna 32 can be enough to take up any gear backlash and thus lower the received satellite signal level from the optimum.

A help line 74 is activated by a user, for example, by a help button, whenever there is a problem or help is needed. Such problems include the need to tune the satellite receiver 54 and to steer the antenna 32. When the user is having a reception problem, and the help button is pressed, an automated phone call is initiated by the command decoder 50 to the network controller 12. A message is sent, e.g., digitally by modem, over line 46 to identify the user site. The network controller 12 responds by sending the correct settings for the user equipment 30 either by radio or by landline. A message follows the settings to advise the user at the particular user equipment 30 that corrective action has been taken and to use the help button again if the problem persists. For example, a telephone handset, computer or other peripheral equipment may be attached to the user equipment 30 to allow more direct communication with the user and the network.

Except for the radio frequency functions of the user equipment 30, all of its elements may be implemented with software and conventional microcomputers and digital electronics. A principal objective in any such implementation to remove from the user any sort of control that could affect program reception. All receiver and antenna control is by remote from the network controller.

Figure 3:
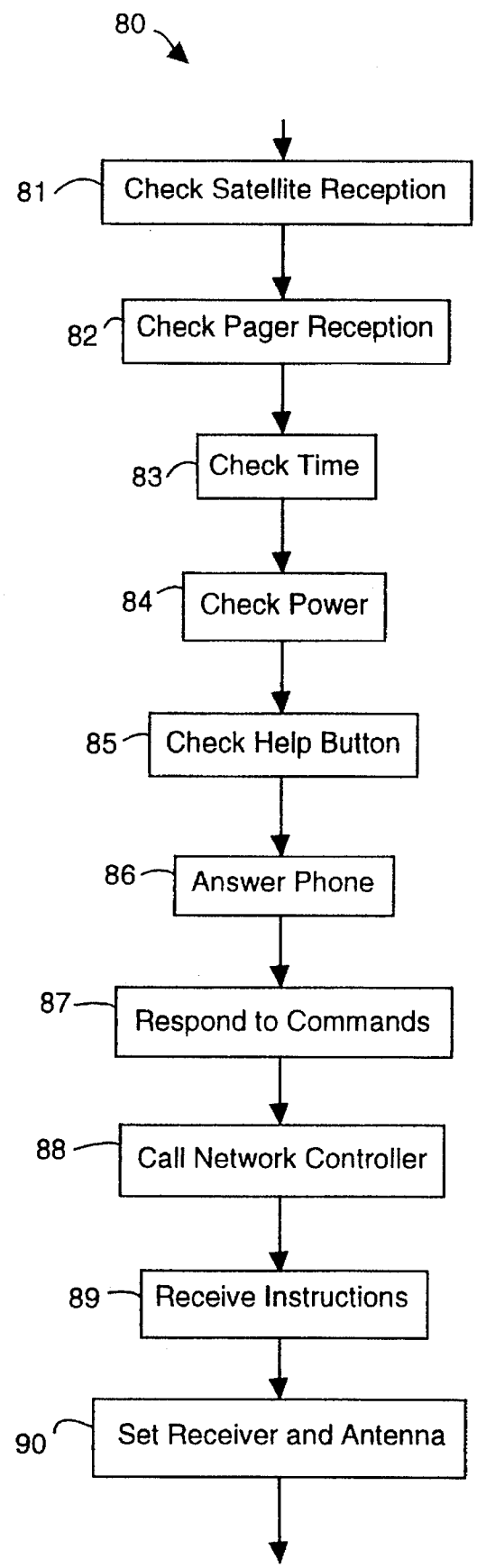
FIG. 3 is a flow chart of a computer-implemented process of the present invention.

FIG. 3 illustrates a computer-implemented process of the present invention, referred to by the general reference numeral 80. The process 80 is implemented in computer software when the user equipment is constructed of microcomputers and software. A step 81 checks the tuning and reception quality of the satellite receiver 54 and logs its condition with a time tag in the memory 68. A step 82 checks the tuning and reception quality of the pager receiver 58 and logs its condition with a time tag in the memory 68. A step 83 checks the time-of-day from clock 66 and uses the information to keep time tag data correct. A step 84 checks the power supply 70 for utility power input and logs its condition with a time tag in the memory 68. The help line 74 is checked in a step 85. A step 86 answers line 44 if a call is coming in, e.g., from the network controller 12. A step 87 calls any commands received from the satellite receiver 54, the pager receiver 58 or the phone interface 44 and issues the appropriate control actions, e.g., antenna steering through the dish pointing controller 52 and a corresponding channel to tune in the satellite receiver 54. A deciphering key, if required by the program decoder 56, is sent by the network controller 12 in step 87. If the help line 74 was active in step 85, or the reception checks in steps 81 or 82 indicated a problem, a step 88 initiates a call through the interface 62 to the network controller 12. New instructions to command the user equipment through the command decoder 50 are received in a step 89. A step 90 uses the received instructions and commands to set the clock 66, the dish-pointing controller 52, the satellite receiver 54, the program decoder 56 and the pager receiver 58.

Overall, a closed-end system for simple end-user operation is provided by the system 10 by configuring the user equipment 30 to automatically call the network controller 12 and report problems or download scheduled reports. The user equipment 30 also preferably calls the network controller 12 on its own when it receives a request to do so by wireless communication, in order to verify closed-loop functionality. The user equipment 30 conducts self-diagnoses to evaluate and identify hardware problems, network signal and command reception problems, and video and audio programming signal quality.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A satellite-program user equipment, comprising:

a fixed-location microwave radio receiver for connection to a steerable-dish antenna for receiving plurality of satellite signals comprising program and command signal transmissions broadcast from a plurality of orbiting satellites;

a program decoder connected to the microwave radio receiver for deciphering individual programs and commands from said received satellite signals;

a pager-service receiver for detecting radio signals and decoding commands addressed to said user equipment;

a command decoder connected to receive said commands from the program decoder and the pager-service receiver and for organizing said commands into control signals;

a telephone interface for communicating with a remote network controller in charge of said program and command signal transmission broadcasts; and a diagnostic unit connected to receive condition information from the microwave radio receiver, the program decoder and the pager-service receiver and to report an output with a phone connection initiated by the telephone interface to a network controller.

2. The equipment of claim 1, further comprising:

a command decoder connected to receive command signals originated from said network controller from the microwave radio receiver, the program decoder, the pager-service and the telephone interface and to output control signals in response to tune the microwave radio receiver.

3. The equipment of claim 2, further comprising:

a dish-pointing controller connected to the command decoder for controlling the aiming of said steerable-dish antenna.

4. The equipment of claim 1, further comprising:

a time-of-day clock providing for time information to time-tag said conditions stored in a local memory connected to the diagnostic unit.

5. A satellite-program user equipment, comprising:

a fixed-location microwave radio receiver for connection to a steerable-dish antenna for receiving a plurality of satellite signals comprising program and command signal transmissions broadcast from a plurality of orbiting satellites;

a program decoder connected to the microwave radio receiver for deciphering individual programs and commands from said received satellite signals;

a pager-service receiver for detecting radio signals and decoding commands addressed to said user equipment;

a command decoder connected to receive said commands from the program decoder and the pager-service receiver and for organizing said commands into control signals;

a telephone interface for communicating with a remote network controller in charge of said program and command signal transmission broadcasts;

a diagnostic unit connected to receive condition information from the microwave radio receiver, the program decoder and the pager-service receiver and to report said conditions with a phone connection initiated by the telephone interface to a network controller;

a command decoder connected to receive command signals originated from said network controller from the microwave radio receiver, the program decoder, the pager-service and the telephone interface and to output control signals in response to tune the microwave radio receiver; and a dish-pointing controller connected to the command decoder for controlling the aiming of said steerable-dish antenna.

6. A computer-implemented process for controlling the tuning of a satellite receiver and the aiming of a dish antenna at a user site without direct user intervention, comprising the steps of:

checking the tuning and reception quality of said satellite receiver and logging its condition in a memory;

checking the tuning and reception quality of a pager receiver and logging its condition in said memory;

initiating a report from said user site over a telephone connection to a network controller if said receivers condition indicates a problem requiring attention;

receiving a command from said network controller via one of said satellite receiver, said pager receiver and said telephone connection; and controlling said tuning of said satellite receiver and the pointing of an antenna connected to said satellite receiver according to said commands from said network controller.

* * * * *